No. 727,475. PATENTED MAY 5, 1903.
O. L. STADIG.
MANURE SPREADER.
APPLICATION FILED AUG. 16, 1902.
NO MODEL. 2 SHEETS—SHEET 2.
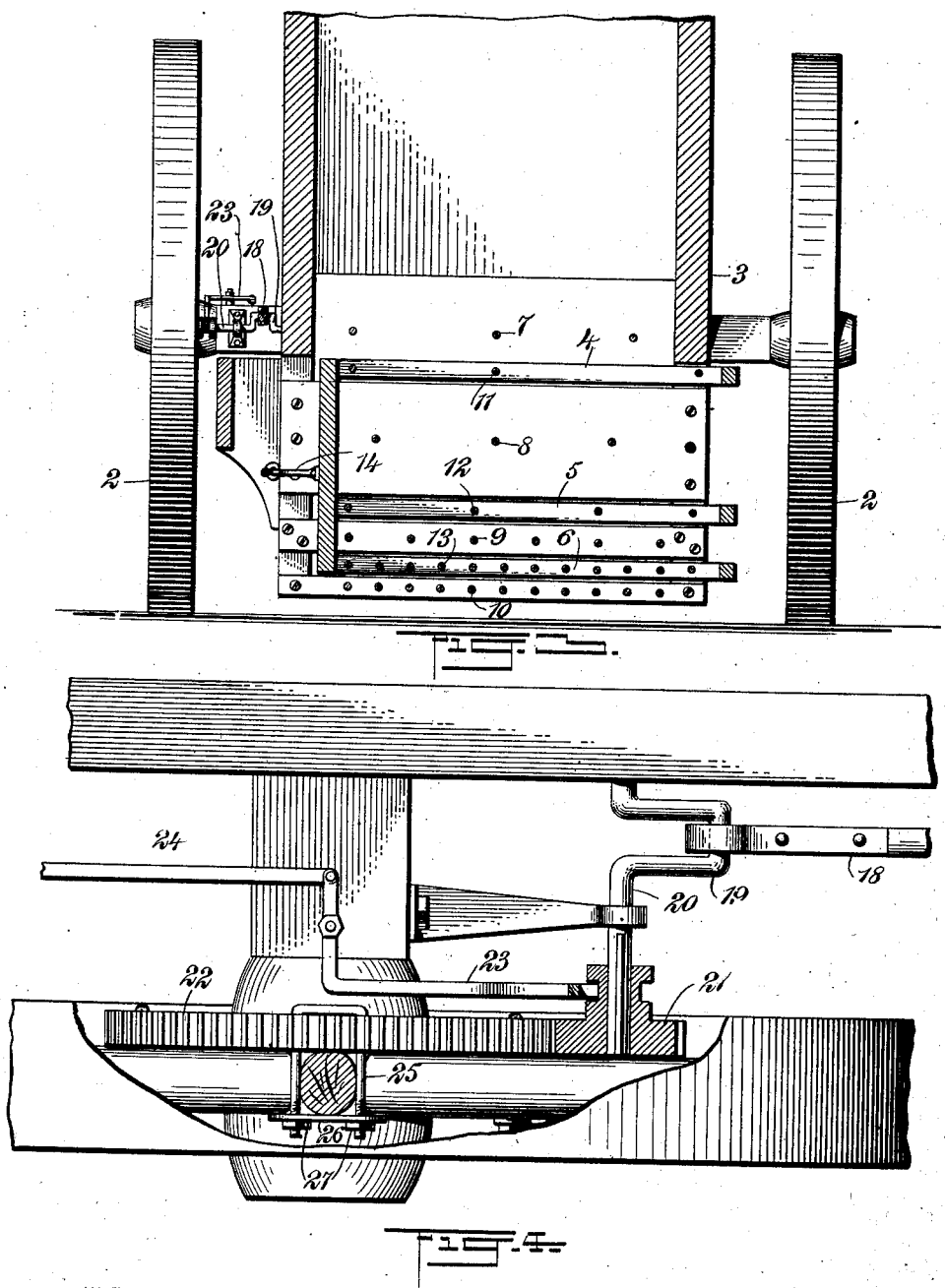
WITNESSES:
INVENTOR
Olof L. Stadig
BY
ATTORNEYS.

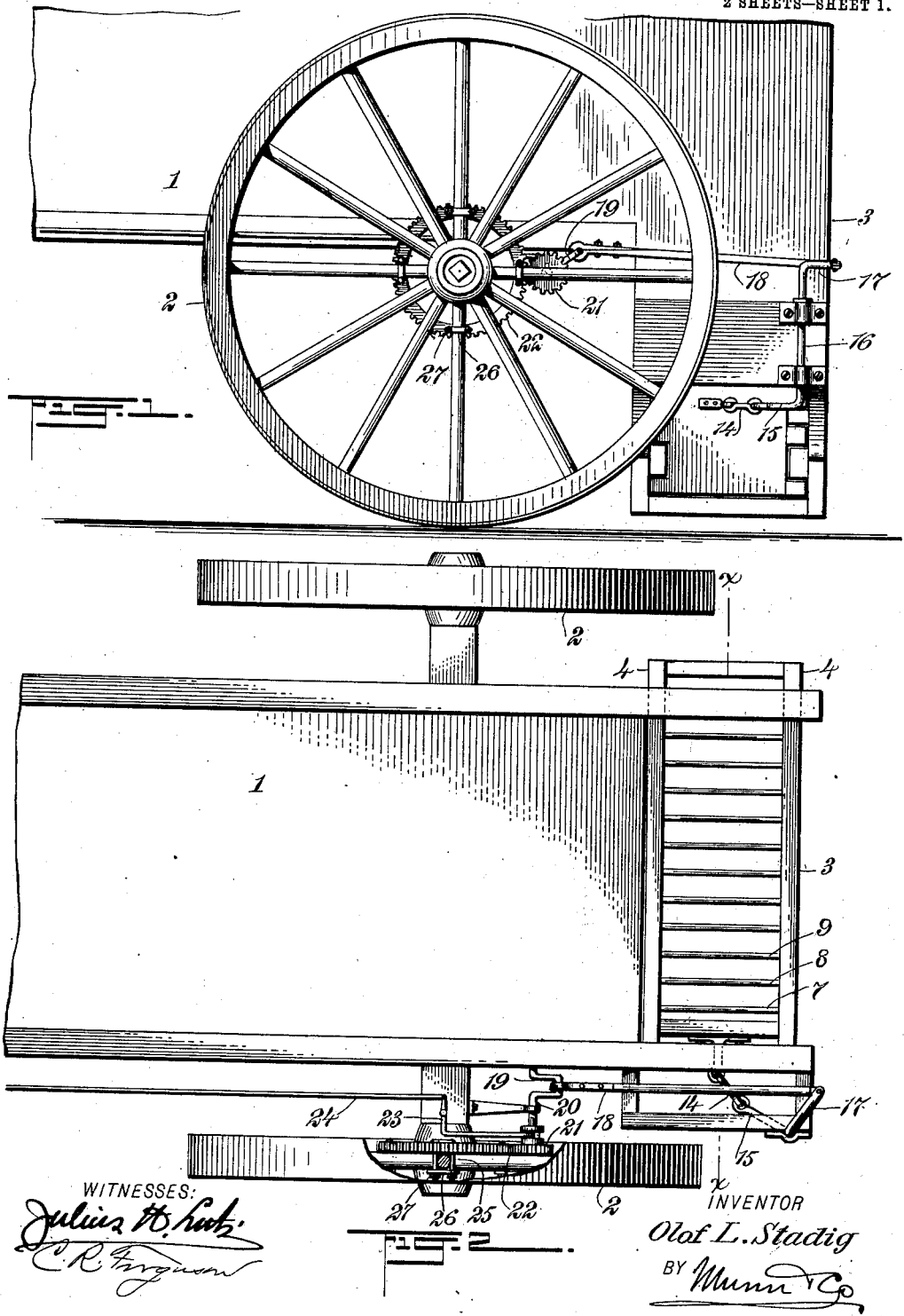

No. 727,475.  
Patented May 5, 1903.

UNITED STATES PATENT OFFICE.

OLOF L. STADIG, OF ST. FRANCIS, MAINE.

MANURE-SPREADER.

SPECIFICATION forming part of Letters Patent No. 727,475, dated May 5, 1903.

Application filed August 16, 1902. Serial No. 119,889. (No model.)

*To all whom it may concern:*

Be it known that I, OLOF L. STADIG, a citizen of the United States, and a resident of St. Francis, in the county of Aroostook and State of Maine, have invented new and useful Improvements in Manure-Spreaders, of which the following is a full, clear, and exact description.

My invention relates to improvements in devices for spreading manure or other fertilizer of a lumpy character, the object being to provide a crusher and spreader of simple construction that may be readily attached to any wagon or cart and operated from a wheel of the wagon or cart to crush the fertilizer before spreading it on the ground.

With these ends in view the invention consists in the novel construction and arrangement of parts, which will be hereinafter fully described and claimed.

Reference is to be had to the accompanying drawings, forming a part of this specification, in which similar characters of reference indicate corresponding parts in all the figures.

Figure 1 is a side elevation of a manure-spreader embodying my invention. Fig. 2 is a plan view thereof. Fig. 3 is a section on line $x\,x$ in Fig. 2, and Fig. 4 is a detail plan showing the mechanism connecting with a wheel for operating the device.

Referring to the drawings, 1 designates a wagon or cart body, and 2 designates the rear wheels. On the rear end of the body and communicating therewith is a casing 3, in which a frame comprising bars 4, 5, and 6 reciprocates. These bars move in channels or grooves arranged in the front and rear walls of the casing 3, and extended transversely and connecting with the said front and rear walls of the casing are several sets of bars 7, 8, 9, and 10. The opposite bars of the reciprocating frame are also connected by cross-bars 11, 12, and 13. It will be noted that the several sets of bars are arranged progressively in closer relation from the top downward, the lower bars 13 and 10 being quite close together, so as to finely break up the material passing between them. A reciprocating motion of the frame transversely of the wagon or cart is imparted by one of the vehicle-wheels. One end of the reciprocating frame is connected by means of a link 14 with the crank portion 15 of a rod 16, having bearings on an end wall of the casing, and on the upper end of this rod 16 is a crank portion 17, which is extended in reverse direction to the crank portion 15. From the crank portion 17 a pitman 18 extends and engages with the crank 19 of a crank-shaft 20. Movable on this crank-shaft 20 is a pinion 21 for engaging with a gear-wheel 22, attached to the vehicle-wheel. This pinion 21 is mounted to slide lengthwise of the crank-shaft, but is caused to rotate therewith by means of a spline connection. The pinion may be moved into and out of engagement with the gear-wheel 22 by means of a shifting lever 23, having a forked end engaging in an annular channel formed in a hub of the pinion, and from one member of this shifting lever 23 a rod 24 extends to the front end of the vehicle. The gear-wheel 22 may be readily attached to a wheel by means of clips 25, which pass through openings in the rim of the gear-wheel and engage on opposite sides of spokes of the ground-wheel, the outer ends of the clips being connected by plates 26 and clamped by the nuts 27.

In operation as the vehicle moves along and the fertilizer is shoveled or otherwise placed in the casing 3, the gearing will cause a reciprocating motion of the frame carrying the bars, and the material passing downward, as before stated, will be broken up or placed in proper condition for distributing on the ground.

Having thus described my invention, I claim as new and desire to secure by Letters Patent—

1. A crushing and spreading device for manure or other fertilizer, comprising a casing, bars extended across said casing, and arranged in sets one set above another, the bars of the several sets being arranged progressively in closer relation to each other from the top downward, a frame mounted to reciprocate in said casing, and cross-bars carried by said frame and arranged in sets one above another, and in closer relation from the top downward.

2. The combination with a vehicle, of a fertilizer comprising a casing, bars extended across said casing and in sets one above another, a frame mounted to reciprocate in the casing, sets of bars extended across said frame, one set above another, a crank-shaft having connection with said frame, and an operative connection between said crank-shaft and wheel of the vehicle.

3. The combination with a vehicle, of a casing, bars extended across said casing, a frame mounted to reciprocate in the casing, a series of sets of bars in the frame, a vehicle-wheel, a gear-wheel mounted in said vehicle-wheel, a crank-shaft, a pinion movable lengthwise of said crank-shaft but rotating therewith, and connections between said crank-shaft and the frame, whereby the frame is reciprocated upon rotary motion of the pinion.

4. In combination with a vehicle, a fertilizer, comprising a casing, sets of bars extended across said casing one set above another, a frame mounted to reciprocate in the casing, bars carried by said frame, a shaft having a crank portion on its lower end and a crank portion on its upper end, a link connection between the frame and said lower portion, a crank-shaft, a pitman connection between said crank-shaft and the upper portion of the first-named shaft, a pinion mounted on the crank-shaft, and a gear-wheel removably connected to a wheel of the vehicle for engaging with said pinion.

In testimony whereof I have signed my name to this specification in the presence of two subscribing witnesses.

OLOF L. STADIG.

Witnesses:
HATTIE PELLETIER,
A. G. FENLASON.